United States Patent [19]

Simopoulos et al.

[11] Patent Number: 4,961,956

[45] Date of Patent: Oct. 9, 1990

[54] ELECTROLUMINESCENT LAMPS AND PHOSPHORS

[75] Inventors: Nicholas T. Simopoulos; George N. Simopoulos, both of Dayton, Ohio

[73] Assignee: Lumel, Inc., Dayton, Ohio

[21] Appl. No.: 349,453

[22] Filed: May 8, 1989

Related U.S. Application Data

[62] Division of Ser. No. 124,808, Nov. 24, 1987, Pat. No. 4,855,189.

[51] Int. Cl.$^5$ ............................................. B05D 5/00
[52] U.S. Cl. ................................... 427/70; 427/213; 427/215; 427/255.3; 427/255.5
[58] Field of Search ................. 427/70, 213, 255.5, 427/215, 252, 255.3, 314

[56] References Cited

U.S. PATENT DOCUMENTS

| | | | |
|---|---|---|---|
| 2,689,188 | 9/1954 | Hushley | 427/64 |
| 2,944,177 | 7/1960 | Piper | 313/108 |
| 2,951,169 | 8/1960 | Faria et al. | 313/108 |
| 3,005,721 | 10/1961 | Cerulli | 106/47 |
| 3,163,592 | 12/1964 | Dolan et al. | 204/181 |
| 3,264,133 | 8/1966 | Brooks | 427/64 |
| 3,294,569 | 12/1966 | Messineo et al. | 427/64 |
| 3,376,453 | 4/1968 | Leach | 213/108 |
| 3,394,031 | 7/1968 | Ramm | 427/64 |
| 3,408,223 | 10/1968 | Shortes | 427/64 |
| 3,492,105 | 1/1970 | Peaender | 68/60 |
| 3,984,587 | 10/1976 | Lipp | 427/70 |
| 4,097,776 | 6/1978 | Allinikov | 313/502 |
| 4,122,213 | 10/1978 | Ito et al. | 427/64 |
| 4,143,297 | 3/1979 | Fischer | 313/502 |
| 4,181,953 | 1/1980 | Fischer | 427/64 |
| 4,263,339 | 4/1981 | Fischer | 427/64 |
| 4,508,760 | 4/1985 | Olson et al. | 427/213.34 |
| 4,544,605 | 10/1985 | Miyazki et al. | 428/404 |
| 4,585,678 | 4/1986 | Ligai | 427/70 |
| 4,592,924 | 6/1986 | Kuppers et al. | 427/255.3 |
| 4,661,381 | 4/1987 | Callies et al. | 427/225.3 |

FOREIGN PATENT DOCUMENTS

| | | |
|---|---|---|
| 0030521 | 3/1974 | Japan . |
| 5026782 | 5/1975 | Japan . |
| 4941094 | 11/9174 | Japan ................................. 427/70 |

OTHER PUBLICATIONS

"Fundamentals of Silicon Integrated Device Technology", vol. 1, Burger et al., Prentice-Hall, Inc., 1967, pp. 36-105.

U.S. Defense Department Technical Report AFFDL-- TR-68, 103 "Improving the Performance of Electroluminescent Lamps at Elevated Temperatures", Jul. 1978.

Primary Examiner—Janyce Bell
Attorney, Agent, or Firm—Biebel, French & Nauman

[57] ABSTRACT

Electroluminescent phosphors, electroluminescent panels and lamps made with such phosphors, and a process and apparatus for treating phosphors are disclosed in which the phosphor particles are coated with a very thin coating of $SiO_2$, to protect the phosphor particles from aging due to moisture intrusion. The phosphor particles are coated in a cold wall reactor by the pyrolytic decomposition of silane in the presence of heat and oxygen to a coating thickness of approximatley between 0.1 and 3.0 microns. The apparatus and method of coating includes the placement of a quantity of phosphor in a cup-shaped heated reactor bowl and subjecting the particles to a temperature of about 490° C. and an atmosphere of silane and oxygen, while continuously mechanically agitating the particles with a blade arrangement in which the particles are continuously rotated and turned so as to expose the surfaces of the heated particles to the reaction atmosphere. Panels and lamps made from such phosphors may be die cut and trimmed, have an increased life as compared to panels and lamps made with untreated phosphors, and exhibit a minimum of color shift during the lifetime of the panel.

7 Claims, 5 Drawing Sheets

ELECTROLUMINESCENT LAMPS AND PHOSPHORS

RELATED APPLICATION

This application is a division of application Ser. No. 124,808 filed Nov. 24, 1987 now Pat. No. 4,855,189 issued Aug. 8, 1989.

BACKGROUND OF THE INVENTION

This invention relates to improved electroluminescent lamps and phosphors, and to a method of making such improved phosphors.

Conventional electroluminescent lamps have panels which are made with electroluminescent phosphors, such as copper activated zinc sulfide, embedded in a resin layer between a pair of electrodes. Such conventional lamps suffer from aging and degradation due to moisture, such as by the migration of water molecules into the matrix of the phosphor crystals. The aging process is accompanied by a loss in brightness, for a given level of excitation, and a shift in color of the lamp, both in the lamp's lighted and unlighted status. As a result, it has become necessary to go to extraordinary lengths to protect such lamp and panels against moisture.

The lighted panels of conventional lamps also do not lend themselves to manufacturing processes which include die cutting, punching, perforating, or trimming through the active phosphor layer, as such operations will either immediately short out the lamp, or will result in a premature loss of brightness in the vicinity of the cut, and often accompanied by eventual failure of the entire lamp. Such behavior of conventional lamps severely restrict the use of electroluminescent lamps in many commercial applications which require punching, die cutting or the like, in a lowcost and mass-produced panel and/or in which moisture is present.

Electroluminescent lamps which lack extraordinary external protection against the infusion of moisture are not only prone to suffer from loss of output, i.e., aging, but as noted above are observed to have a shift toward the color pink where the lamp output was originally white. Further, where the natural color of such a lamp in its unlighted condition is an overall light tan, such lamps have been observed, with aging, to take on an overall gray or black color. In many cases, such a change in color is undesirable or unacceptable.

The desirability of encapsulating electroluminescent phosphors to retard aging has been recognized. Both organic and inorganic coatings have been suggested, with varying degrees of success. One approach, as disclosed in the patents of Allinikov, U.S. Pat. No. 4,097,776 issued Jun. 27, 1978 and Olson et al, U.S. Pat. No. 4,508,760 issued Apr. 2, 1985, includes the use of organic or polymer resin materials for encapsulation. In Allinikov, the phosphor particles are immersed in a solution of liquid crystal material and stirred, and thereafter dried to form a resin coating. In Olson et al, specific polymers are vacuum deposited on the surface of the crystals.

Resin coated phosphors have not found general use in the manufacture of electroluminescent lamps since they suffer from many of the same problems as do conventional resin embedded particles, that is, that the resins do not fully exclude moisture and may interact with the phosphor. When such resin encapsulated particles are used as a substitute for conventional uncoated particles, they may be mixed with a resin adhesive and applied, as by screen printing or by a blade, to a substrate in the manufacture of the lamp. The intermediate resin coating surrounding the particles is usually no better in preventing aging than is the adhesive or casting resin itself.

The prior art also contains a number of attempts to provide an inorganic barrier or coating on the phosphor particles, including Piper, U.S. Pat. No. 2,944,177 issued Jul. 5, 1960. In Piper, phosphor crystals or particles are mixed with a glass frit, and then heated to approximately 530° F. until the glass fuses, producing a phosphor and glass agglomerate. This is then cooled and crushed until the resulting particles are sufficiently small so as to be applied as a glass coated particle in lieu of conventional electroluminescent phosphor grains. However, the glass fusing and crushing process of Piper has not come into general usage because of two principal disadvantages. First, in crushing or grinding, many of the phosphor particles themselves are ruptured or broken and exposed, and are therefore subject to the normal effects of aging. Further, the process produces too much glass in relation to the phosphor content, without close control of the thickness of the glass deposition with respect to the phosphor particles.

Brooks, U.S. Pat. No. 3,264,133 of Aug. 2, 1966 discloses the coating of the phosphor particles with an inorganic coatings, such as barium titanate and titanium dioxide, to provide a high dielectric coating. While Brooks achieves an enhancement in brightness due to an increase in dielectric constant, it is not apparent that these coatings are useful to extend the life of the phosphor or exclude moisture.

In a number of related patents, Fischer has described the aging process in zinc sulfide phosphors and provides recipes for rendering the phosphors less immune to aging and for coating the phosphors with inorganic phosphates. These patents include U.S. Pat. Nos. 4,143,297 issued Mar. 6, 1979; 4,181,753 issued Jan. 1, 1980; and 4,263,339 issued Apr. 21, 1981. The aging process is described in '297 as being aggravated by sulfur vacancies in the crystal lattice structure, which vacancies exhibit a negative charge and the presence of which Fischer believes promotes the diffusion of the positively charged copper ions within the grains of the phosphor. Fischer further believes that the copper out-diffuses to the surface and the electroluminescent mechanism becomes inoperative due to this form of aging. It is also clear that the aging is accelerated by the presence of moisture and electrolysis of the zinc and copper. As an intermediate step, Fischer treats his phosphor prior to coating by immersion in molten sulfur under heat and pressure in an autoclave. In '753, the disclosure is enhanced by the suggestion that metals may be added to the sulfur bath.

After the sulfur process, Fischer boils the treated powder in a concentrated phosphoric acid to form an insoluble zinc phosphate skin around each particle. The light transmissive qualities of this coating are not disclosed. Patent '753 discloses a further intermediate step, prior to the phosphoric acid bath, of heating the sulfur treated particles in hydrogen peroxide to convert the zinc sulfide surface to a zinc oxide surface and thereafter treating in phosphoric acid to convert the zinc oxide to the zinc phosphate coating.

Fischer also suggests that the particles can be glass coated, and states that the coating "can also consist of chemically vapor-deposited glass . . . produced by pyrolytic decomposition of metal-organic vapors." No example is given in Fischer of the metal-organic vapors, of any process for accomplishing the process, or of any lamp using such phosphors.

Attempts have been made to coat phosphor particles with glass, i.e., silicon dioxide, and include the U.S. Pat. of Shortes, No. 3,408,223 issued Oct. 29, 1968. Shortes was not concerned with the coating of phosphor particles for use in electroluminescent lamps and therefore was not concerned about extending the life of such a lamp or the phosphors therein, or the exclusion of water vapors from interaction with the phosphor particles. Rather, Shortes was concerned with the manufacture of a cathode ray tube phosphor which had selectively higher electron energy ionization thresholds, and disclosed the coating of phosphor particles by subjecting the phosphors to a tetraethoxysilane atmosphere under high temperature conditions, and subjecting the phosphor particles repeatedly to such atmosphere by recirculating the atmosphere and/or the phosphor particles therethrough so as to provide a silicon dioxide coating. Shortes contains no disclosure of the thickness or character of the coating, or of the efficacy of the use of such a treated phosphor particle in an electroluminescent environment.

United States Defense Department Technical Report AFFDL-TR-68-103 "Improving the Performance of Electroluminescent Lamps at Elevated Temperatures," Jul. 1968 by Thompson et al, published by United States Air Force Flight Dynamics Laboratory, ASFC, Wright-Patterson Air Force Base, Ohio, discloses the coating of electroluminescent particles with various refractory materials including silicon dioxide, titanium dioxide, and beryllium oxide, among others. All of the coatings were applied by the pyrolysis of chemical vapors at atmospheric pressure in a heated fluidized bed reactor. The silicon dioxide coatings were applied by the decomposition of tetraethyl orthosilicate Si-$(OC_2H_5)_4$ or silicon tetrachloride $SiCl_4$ with reactor temperature of 400° C. There is no mention in this respect of silicon coated phosphors used in an electroluminescent lamp. Rather, the authors concentrated primarily on the use of titanium and beryllium coated phosphors in making, and then testing electroluminescent lamps at very high operating temperatures. The titanium coated particles tended to fuse together or cluster into groups of coated particles, and it was difficult to maintain the desired phosphor population in a lamp, apparently due to the shape of the particles and the quantity of coating included. Accordingly, the overall lamp brightness was reduced due to the reduced phosphor particle populations as compared to a conventional lamp using uncoated phosphors. The authors, however, indicated that the silicon dioxide coated zinc sulfide phosphor was given an accelerated water vapor resistance test, not otherwise described, and indicated that the material "looked like it showed promise."

SUMMARY OF THE INVENTION

This invention relates particularly to an electroluminescent lamp incorporating phosphor particles which are coated with a thin coating of silicon dioxide, and to such phosphors and the method of making the same.

Applicants have discovered that an electroluminescent lamp made with a phosphor in which the individual phosphor particles are coated with a very thin coating of silicon dioxide, provides surprising and unexpected results. Such a lamp has been found to have aging characteristics which closely parallel those of fully incased lamps. In addition, such lamps according to this invention do not initially suffer any substantial loss in brightness by reason of the presence of the coating on the phosphor particles, and do not exhibit the characteristic color shifts with aging which have been observed in conventional lamps. Also, the lamps, and the panels from which such lamps are made according to this invention, may be cut, punched, or othewise severed through the active phosphor coating with minimal darkening, discoloration or loss of brightness at the exposed edges.

The invention also includes the method and apparatus by which electroluminescent phosphors are treated, by the application of a thin homogeneous coating of silicon dioxide to the particles, in the nature of one micron or less in thickness. A cold wall reactor is disclosed, which provides for the heating of phosphor particles to a temperature sufficient to decompose silane in the presence of oxygen, while providing for the stirring and agitation of the particles so that all sides are uniformly coated.

More particularly, the coating method employed by the coating apparatus of this invention includes the steps of heating the phosphor particles to be coated and while so heated, subjecting the particles to an atmosphere of silane and oxygen such as to cause silicon dioxide to be directly vapor-deposited uniformly over the surfaces of the phosphor particles. Examination confirms the formation of a thin clear glass coating fully surrounding the individual particles. To enhance the coating process, an electrostatic charge may be applied to the gas ions or between the gas ions and the particles to enhance migration of the gas ions and their combination on the surfaces of the phosphor particles. More particularly, the phosphor to be treated is subject to a controlled environment of $SiH_4$ and $O_2$, at an elevated temperature above that required to decompose the $SiH_4$, such as about 480° C., while causing the particles to be moved, tumbled, or stirred, and preferably while directing the gases to the particles' surfaces so as to form complete glass coatings on the particles.

The improved phosphor, according to this invention, exhibits a clear coating of silicon dioxide as far as discernible, in a single thin layer between 0.1 and 3.0 microns in thickness, and preferably between 0.4 and 1.0 microns. The thickness of the layer does not vary materially between phosphor particles of different sizes. Since the silicon dioxide layer is formed in a continuous process, the layer on the particles is homogeneous and free of demarcation lines or changes in crystalline structure in relation to its thickness. This single, homogeneous layer of silicon dioxide is attributed to the cold wall reactor and process of this application, and by the use of silane as the silicon donating compound, and oxygen, in the process.

It is accordingly an important object of this invention to provide an electroluminescent phosphor and a lamp employing such phosphors, highly resistant to aging due to moisture or water molecule intrusion.

Another object of this invention is the provision of a lamp, as outlined above, characterized by uniform light output throughout the service life, with a minimum of color shift either in the energized or unenergized condition.

A still further object of the invention is the provision of a flexible electroluminescent lamp including a panel section which may be die-cut, trimmed and punched, without any substantial loss of light output or darkening around the cut edges, and without premature failure of the lamp.

A further object of the invention is the provision of a method of applying a uniformly thin and uniformly distributed silicon dioxide coating to electroluminescent particles for use in lamps.

Another object of the invention is the provision of a cold wall reactor apparatus useful in the controlled application of silicon dioxide coating to phosphors.

A further object of the invention is the method of coating electroluminescent phosphors and phosphors so coated by the pyrolitic decomposition of silane in the presence of an oxygen carrier.

These and other objects and advantages of the invention will be apparent from the following description, the accompanying drawings and the appended claims.

BRIEF DESCRIPTION OF THE ACCOMPANYING DRAWINGS

DESCRIPTION OF THE PREFERRED EMBODIMENTS

Figure 1:
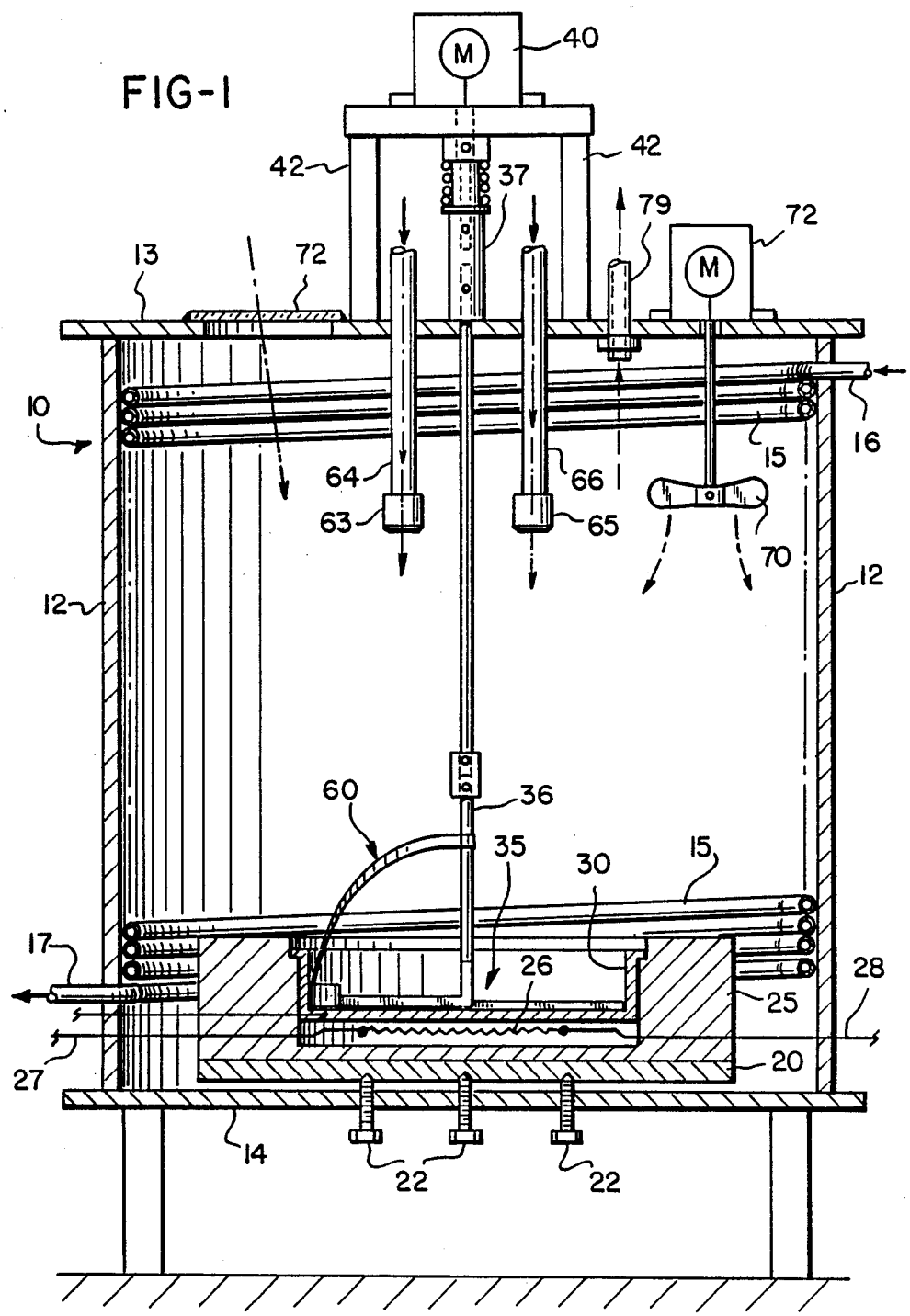
FIG. 1 is a sectional view of a cold wall reactor for coating phosphor particles with $SiO_2$ in accordance with this invention.

Phosphor processed in accordance with this invention is coated with silicon dioxide by chemical vapor deposition in a cold wall reactor illustrated in FIGS. 1-4. The reactor 10 has a generally cylindrical container wall 12 closed by a lid 13 and a bottom 14. The wall 12 of the reactor is chilled by a cooling coil 15, which coil has an inlet 16 at the top and an outlet 17 at the bottom. The cooling coil may be embedded in the wall or may be formed closely to the wall interior as shown or wrapped about the exterior of the wall. The coil 15 cools the wall to maintain a temperature substantially below that in which the silica is deposited on the electroluminescent phosphor crystals.

The cold wall reactor 10 has a base 20 mounted on the floor 14 by a tripod consisting of three adjusting screws 22, shown for the purpose of illustration as being in one line, but which actually occupy 120° relative positions, by means of which the base may be adjusted with respect to the floor 14. The base 20 supports an annular bowl retainer 25. The cup retainer 25 is heated by an electrical resistance heater 26 with leads 27 and 28 extending therefrom.

Figure 2:
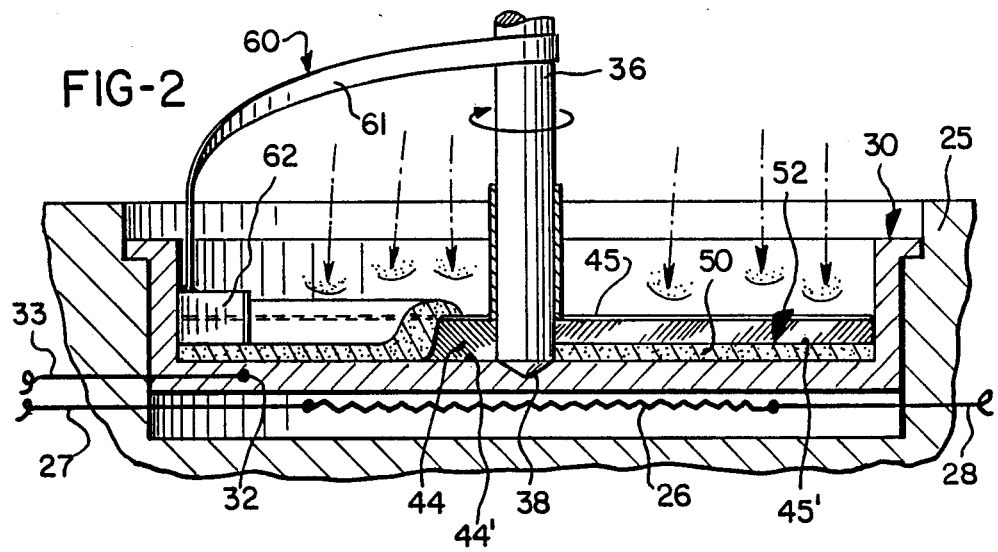
FIG. 2 is an enlarged fragmentary sectional view through the reaction vessel, illustrating the stirring apparatus.

The central portion of the retainer 25 defines a cylindrical opening which receives a high temperature reactor bowl 30 (FIG. 2). The base of the bowl 30 is generally flat with vertical sides. The bowl 30 has embedded therein a thermocouple 32 with a pair of wires 33 thereto. The reactor bowl 30 receives a quantity of phosphor to be treated to an elevated temperature. A combined stirring, scraping and smoothing blade arrangement illustrated generally at 35 is received within the bowl for scraping, lifting, spreading and smoothing the heated electroluminescent phosphor 50 within the bowl 30, as rotated by an adjustable stirring rod 36. The lower end of the rod 36 is received within a conical central depression 38 (FIG. 2), formed in the bowl, forming a centering bearing for the rod 36. The blade arrangement 35 is mounted on the lower end of the stirring rod 36. As shown in FIG. 1, the upper end of the rod is adjustably driven by a coupler 37 to a 0.5 rpm DC drive motor 40, mounted on legs 42 on the cover 13.

Figure 3:
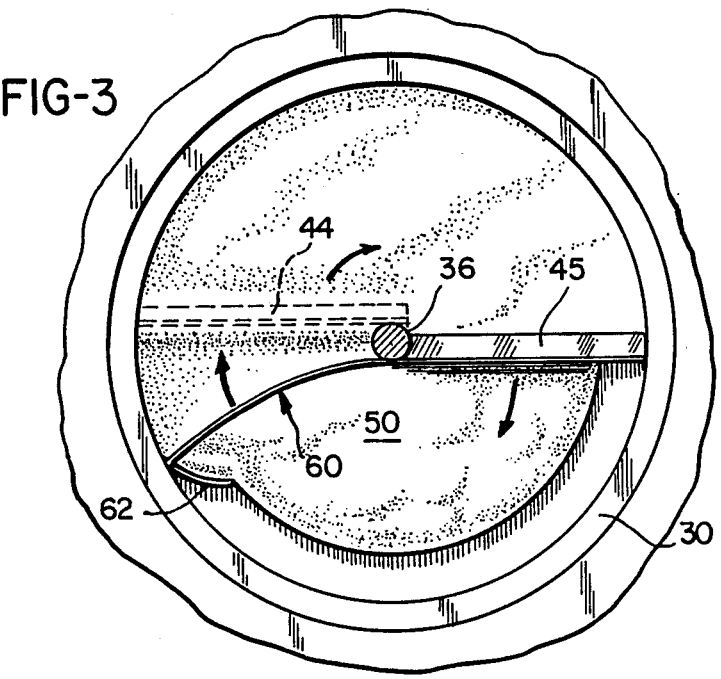
FIG. 3 is a view of the reaction vessel looking down into the phosphor-containing bowl.

With further reference to FIGS. 2 and 3, the blade arrangement 35 includes sheet metal lifting and scraping blade 44 and a smoothing blade 45. The blades 44 and 45 extend generally radially outwardly from the rod 36, and are welded, such as by spot welding to opposite sides of the rod, as shown in FIGS. 2 and 3. The lifting and scraper blade 44 defines an angulated mixing paddle, with a lower flat edge 44 which rides along the flat bottom of the reactor bowl 30. The block 44 has a radial length extending to the vertical walls of the bowl, and firm about a 30° angle to the floor. The blade 44 runs submerged in the phosphor and its inclined surface gently engages the phosphor 50 in the bowl and causes the phosphor to be lifted along the surface, turned, and deposited behind it in its direction of travel, as illustrated in FIG. 2.

The opposed smoother blade 45 is also paddleshaped and has a lower straight edge 45' in spaced relation to the floor of the bowl 30. The blade 45 follows the blade 44 by approximately one-half turn or 180°, and smooths the upper surface 52 of the phosphor 50 after it has been turned by the lifting and scraping blade 44.

A third blade indicated generally at 60 is mounted on an arm 61 for rotation with the rod 36 and has an outer paddle-like or leaf-like end 62, as best shown in FIG. 3. The blade end 62 engages phosphor in the corners of the bowl and along the bowl wall, and moves it in a pile away from the wall for engagement and leveling by the following blade 45.

The cold wall reactor 10 includes a pair of gas diffuser nozzles, shown in FIG. 1. A first nozzle 63 is mounted on the end of a depending tube 64, and a second nozzle 65 is mounted on the end of a depending tube 66. One or more additional inlet tubes (not shown) may be mounted in the cover such as for applying other gasses used as dopants.

The tubes 64 and 66 depend through the cover 13 and extend partially into the interior of the reactor 10. The nozzles 63 and 65 are pointed downwardly toward the bowl 30, and one of these nozzles, such as the nozzle 63, emits a nitrogen-silane mixture while the other nozzle 65 emits oxygen. The tube 64 is connected to means (not shown) by which silane gas ($SiH_4$) is blended with nitrogen, in an approximate ratio of 1 to 2% silane to 99 to 98% nitrogen. An amount of oxygen through the nozzle 65 is sufficient to provide a Molar concentration of 3 to 1 or greater oxygen to silane. If desired, a small impeller 70, driven by a motor 72, may be employed to assure circulation of the products within the reactor.

In use, a crystalline phosphor, of the general kind described below, is deposited in the bowl 30 approximately to the level of the blade 45. For a five-inch diameter bowl, approximately 15 grams of phosphor crystals are placed in the bowl. Pure nitrogen is then introduced through the nozzle 63 to flood the interior and to expel any other gases, through an outlet tube 79 in the cover 13. At the same time, the heating element 26 is turned on and a temperature controller permits the reactor bowl to heat up to 100° C., to allow the temperature to stabilize. The motor 40 may now be turned on. By viewing the process through a topviewing window 72, one can observe that the phosphor crystals are being smoothed by the blade 45 and turned by the blade 44. If the level of phosphor appears uneven, the level of the bowl may be adjusted by the screws 22.

Following this, the temperature may be increased to approximately 200° C., allowed to stabilize, and then increased to 400° C. and stabilized. After such stabilization, silane gas is blended with the nitrogen in the ratios defined above and brought in through inlet tube 64 and nozzle 63, and oxygen is admitted through the nozzle 65, and the reactor temperature is raised to 450° C., allowed to stabilize, and then increased to 490° C. As an example, satisfactory results have been obtained with flow rates of 1.29 liters per minute of a silane nitrogen mixture and 1.85 liters per minute of oxygen, in which the ratio of silane to nitrogen was 1% silane, 99% nitrogen.

Cooling water is forced through the cooling coils 15 from the inlet 16 to the outlet 17, to maintain the wall of the reactor 12 substantially cooler than the quantity of phosphor 50 and the bowl 30. This prevents unwanted reactions on these surfaces and encourages the reaction to take place on the phosphor itself.

The circulating impeller 70 and motor 72 assures that the gases are circulated to prevent stratification of temperature. It has been found that if the temperature at any one location becomes too high, a silica dust tends to form which acts as a contaminate to the phosphor. On the other hand, if the gases become too cold, they will unduly chill the exposed layer of phosphor on the surface of the bowl 30 and substantially increase the reaction time. The silane at the reaction temperature 490° C. undergoes a pyrolytic decomposition to form pure silica and hydrogen. The amount of hydrogen produced by the reaction is very small, and due to the large quantity of nitrogen present, it is not a hazard.

Figure 4:
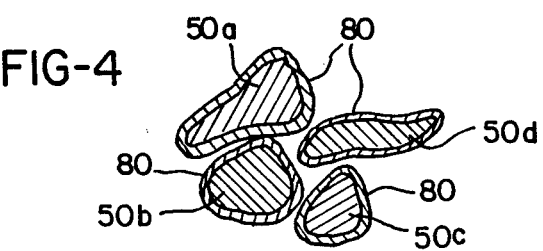
FIG. 4 is an enlarged cross-sectional view of the coated particles.

The slow rotation of the stirring rod 36 causes the blade 44 to scrape the heated phosphor 50 from the bottom of the bowl 30 and gently lift the same over the top of the blade, where it free falls behind the blade, thus gently turning the phosphor particles to expose new heated particles to the reaction gases at the surface where the major portion of the coating process occurs. The particles are heated by contact with the bowl surfaces then turned and brought to the surface for reaction by the action of the blades. The blade 44 thus runs substantially submerged in the pool of phosphor particles 50, as shown by the broken outline view in FIG. 3, while the smoothing blade 45 has its bottom edge 45' spaced above the bottom of the bowl, and smooths the phosphor at the surface, also tending to rotate or turn the top phosphor particles as it passes. The blade 45 also levels the row of phosphor made by the paddle end 62 of the arm 60. The combined actions of the blade arrangement 35 assures that each particle is smoothly and completely encapsulated and covered as shown in FIG. 4, and further resists the tendency of the phosphor particles to group together or form in clumps.

The reactor 10 is allowed to run for approximately 1.5 to 2.5 hours at the final temperature, and then is shut down. The phosphor crystals, as magnified approximately 1200 times are shown in FIG. 4 as having a uniform coating 80 of silicon dioxide, which coating is fully continuous about each particle with very little evidence of clumping of particles. Further, the coating 80 is approximately the same thickness for each of the individual particles 50a, b, c, and d, regardless of the shape or size of the particles.

Good results have been obtained by the use of a blended white phosphor, primarily copper or magnesium-activated zinc sulfide, in accordance with Sylvania Specification No. 830. This phosphor is found to have a size distribution as follows: 5% exceeds 39.5 microns; 50% exceeds 27 microns; 95% exceeds 14.6 microns. In general, the phosphor particles have a size distribution in which about 90% of the particles are between 14 and 62 microns in size, as measured by a Coulter counter.

The chemical vapor deposition provides a uniformly thin continuous layer, relatively constant thickness with a minimum thickness in the order of 0.1 micron and a maximum thickness in the order of 3 microns. Preferably, the coating thickness is between 0.4 and 1.0 micron. Such an extremely thin coating, in relation to the size of the phosphor particle, permits the highest possible electrical field across the particles and the presence of the coating does not adversely affect or substantially reduce the amount of active phosphor which may be applied to any given electroluminescent panel.

The method and apparatus also permit relatively low temperature deposition which is not harmful to the electroluminescent crystals. The apparatus is of simple construction and relatively easy to operate. Further, the crystals of the phosphor are not in constant motion, and are covered or coated in essentially a single process.

Test panels were made employing phosphor which has been conditioned in accordance with this invention and compared with identical test panels using uncoated phosphor. The test panels were compared to panels which were completely sealed in polychlorotrifluoroethylene, such as "Aclar", available from Allied Chemical Company, after the panel was completed, for total exclusion of moisture.

In each of the test panels, a base resin was prepared for the phosphor layer, for the dielectric layer, for the electrode layer, and for a protective overlayer of the same resin material, namely a polyester base consisting of approximately 50% cyclohexanone, 16.7% diethylene glycol monobutyl ether acetate and 33.3% polyester adhesive 49001 of Dayton Chemicals Division. This base resin was then mixed approximately 72% processed phosphor to 27% resin for the phosphor layer, 55% barium titanate for the dielectric layer, and 71% flaked silver for the conductive layer. 100% resin was used for the protective layer. Each of the layers was activated by approximately 0.4% to approximately 1.6% Adcoat Catalyst F of Morton-Thiokol, Inc. to reduce curing time. All percentages are by weight.

Figure 5:
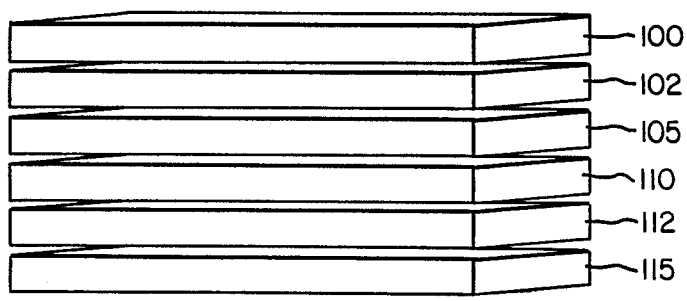
FIG. 5 is a diagrammatic cross section through a lamp panel in accordance with this invention.

Lamps constructed for the purpose of the evaluation of the conditioned phosphor in accordance with this invention are illustrated in FIG. 5. Each of the test lamps was constructed on a clear flexible base 100 of PET (biaxially oriented polyethylene terephthalate) material, to which had been applied a transparent electrode which is diagrammatically illustrated at 102. The transparent electrode is a metalized, vapor deposited indium-tin-oxide conductive coating having a resistance in the order of $175 \pm 25$ ohms per square, and is shown in exaggerated thickness.

The base 100 with electrode 102 thereon was heat treated at 121° C. for 30 minutes, to stabilize the film to prevent warping during the ink-drying process.

The phosphor resin layer 105 was applied to the base 100 on the electrode 102 by screen printing after the phosphor had been blended with the resin, as identified above, by thoroughly mixing with a spatula to wet out all of the phosphor particles. The resulting phosphor ink had a viscous cream-like consistency. The phosphor ink was applied through a 157-mesh screen and dried at 110° C. for thirty minutes.

The barium titanate layer 110 was prepared in accordance with the above formula, in which the resin was added to the powder followed by mixing with a spatula to wet all particles, followed by mixing in a blender at high speed for 10 minutes, and then rolled overnight. Prior to mixing with the resin, the barium titanate powder was sieved and dried at 250° C., to eliminate all moisture prior to blending with the resin. The barium titanate layer 110 was applied as two layers, one directly on top of the other, through a 95-mesh screen. Each layer was dried at 110° C. for 50 minutes.

The silver electrode layer 112 was prepared in accordance with the above-defined formula by mixing with the resin with a spatula to wet all particles, then mixed in a high speed blender for 10 minutes and rolled overnight, in the same manner as that of the layer 110. The silver electrode layer was applied through a 330-mesh screen as a single layer and dried for 40 minutes at 110° C.

Finally, a clear protective layer 115 of resin was applied to the silver layer through a 195 mesh screen, and dried for one hour at 110° C. All test lamps were die-cut to 2 inches by 4 inches in size.

Figure 6:
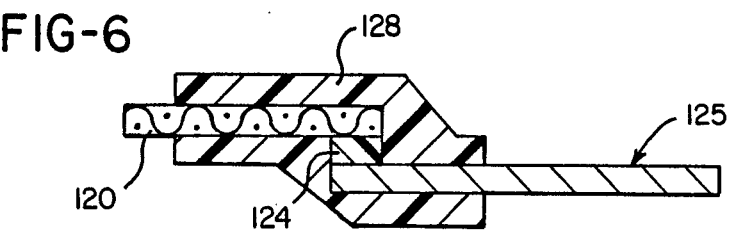
FIG. 6 is an enlarged fragmentary sectional view showing the attachment of an electrode to such lamp.

The lead attachments to the test panels were made as shown in FIG. 6. Wire mesh power leads such as the lead 120 was attached to the silver electrode 112 of a test panel 125 by means of a conductive transfer adhesive 124, and laminated in place. Electrode attachment may also be made by use of conductive epoxy or adhesive. The connection is protected by a layer 128 of Tedlar tape, and applied to the wire mesh leads 120, and to the panel edge, for mechanical support. A similar lead attachment was used for the transparent electrode 102.

Performance tests were made on the test lamps constructed, as defined above, with coated and uncoated phosphors, and compared against the performance of a totally "Aclar" encapsulated electroluminescent lamp. The lamps were tested under three different environmental test conditions: (A) Humidity, with Lamps Operating; (B) Humidity with Lamps Not Operating; and (C) Standard Laboratory Conditions (SLC) with Lamps Operating. Two each of the test lamps were used in each test and the results averaged between them. All electroluminescent lamps, at the beginning of each test, were energized to 12 foot Lamberts. The voltage and frequency operating condition for each type of lamp was as follows:

| Lamp Type | Voltage (VAC) | Frequency (Hz) |
|---|---|---|
| Unprocessed phosphor | 140 | 700 |
| Processed phosphor | 200 | 900 |
| "Aclar" Encased | 100 | 400 |

Figure 7:
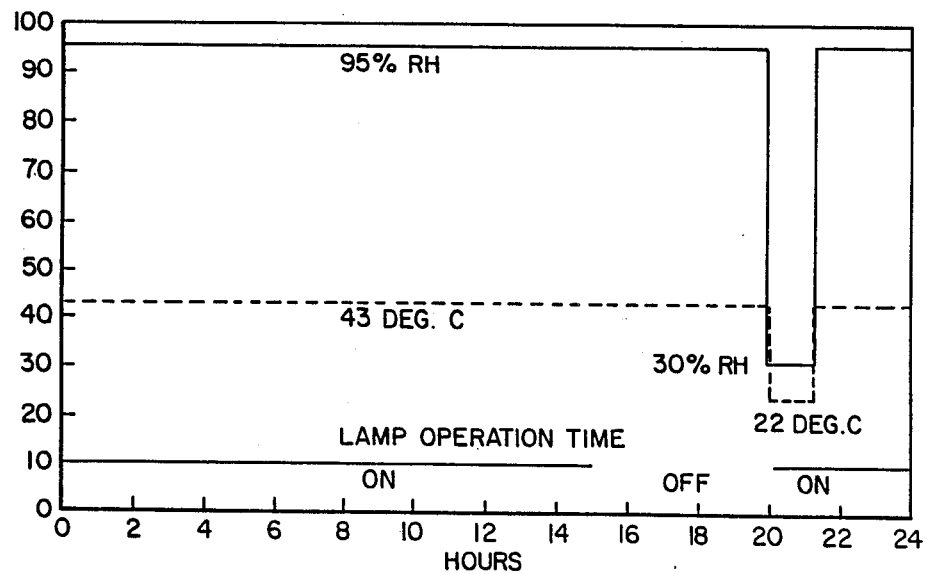
FIG. 7 is a time line diagram of a humidity test.

A diagram (FIG. 7) of the Humidity with Lamps Operating (A) is shown below. The lamps were operated for nineteen hours and off for five hours. The temperature was 43° C. and the humidity was 95% RH except for one hour where the temperature (22° C.) and humidity (30% RH) were lowered to allow access into the chamber for light readings.

The Humidity with Lamps Not Operating test (B) was performed under the same temperature and humidity conditions as (A) above. The lamps were lit during the one hour test at 22° C. temperature and 30% RH to obtain light readings.

The SLC test (C) was conducted with lamps operating continuously. The temperature and humidity under SLC were approximately 22°–24° C. and 40%–60% RH, respectively.

Figure 8:
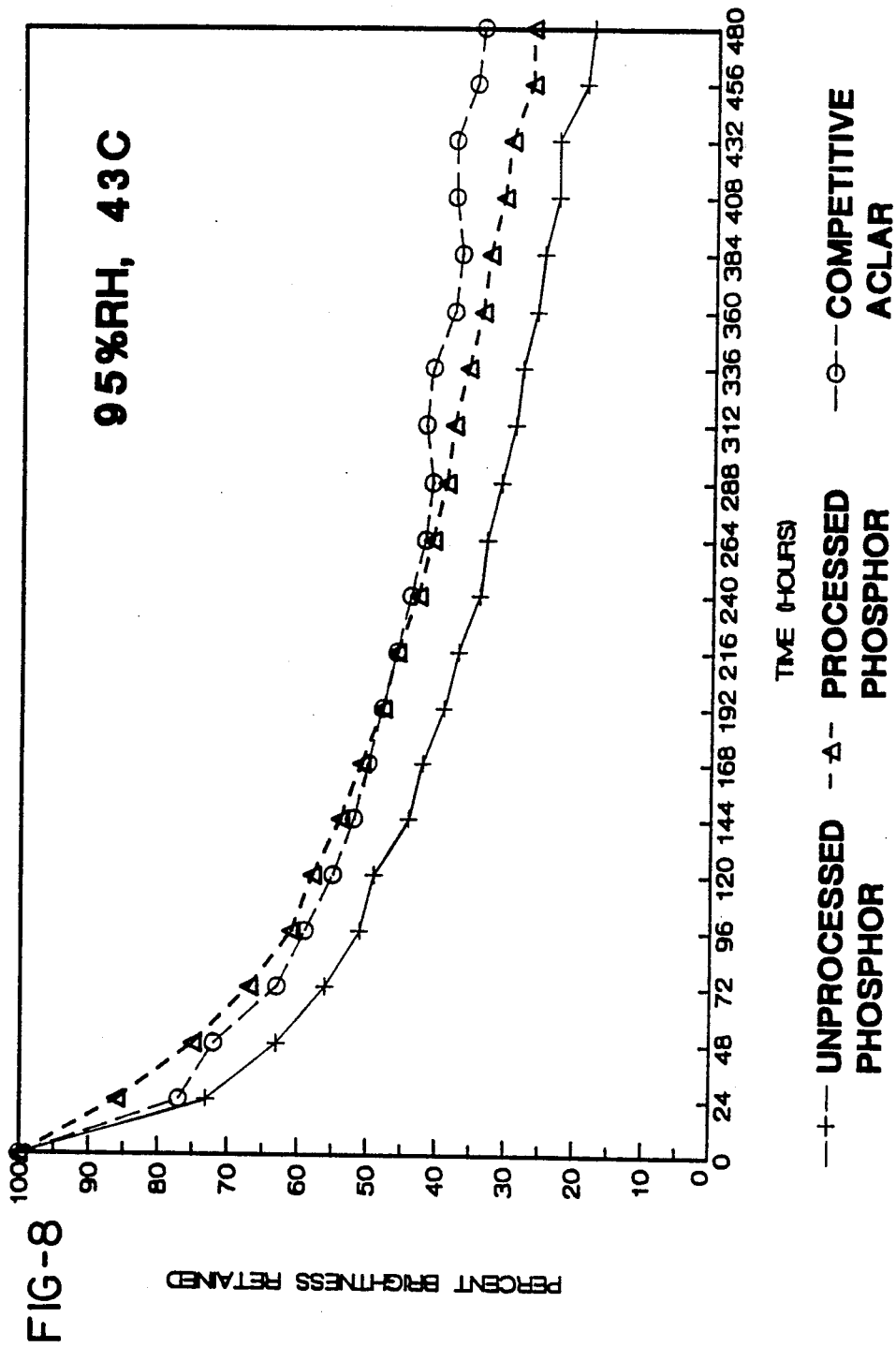
FIGS. 8-9 are performance graphs of test lamps.
Figure 9:
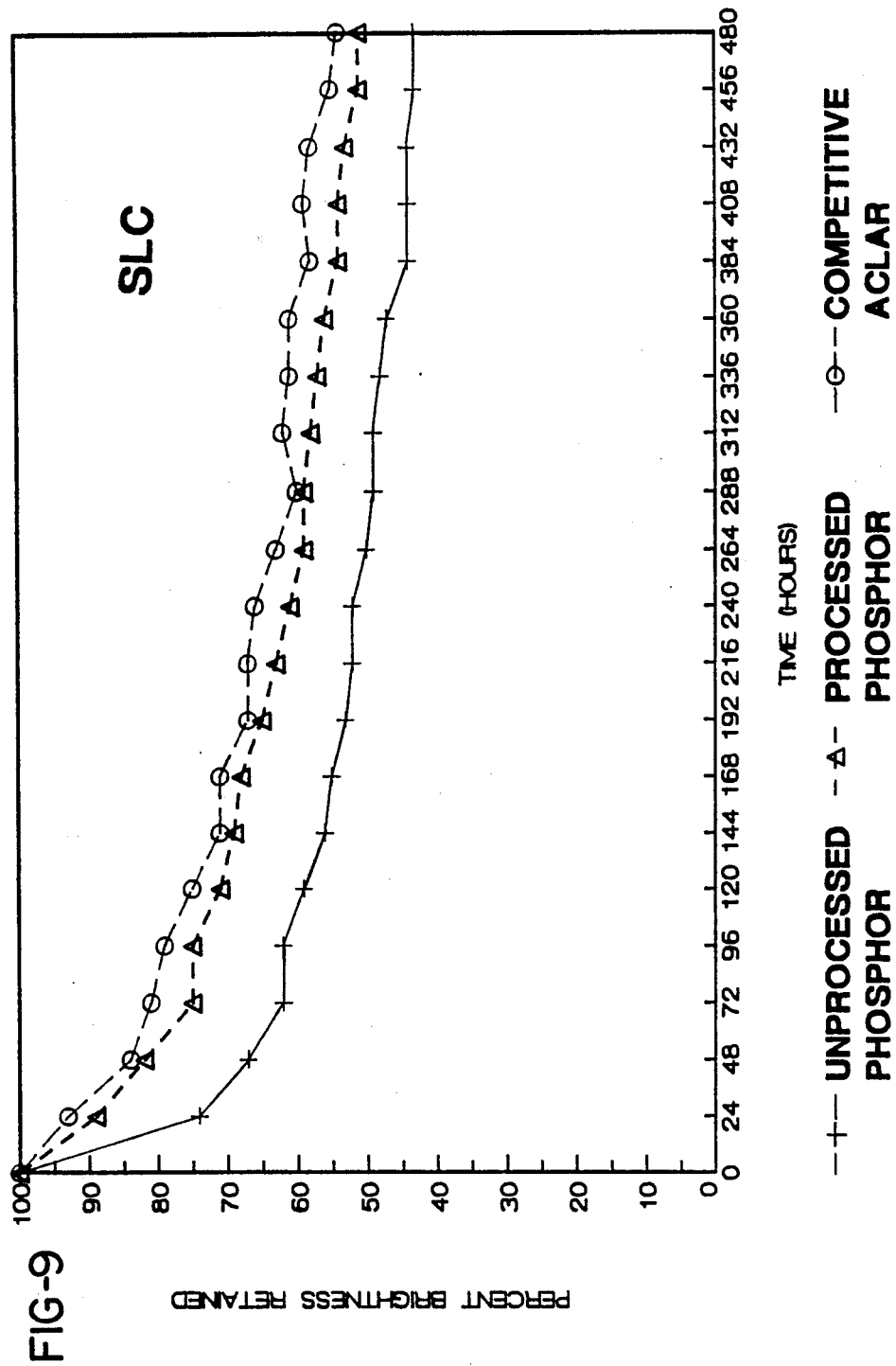

The cumulative results for the three lamp types versus the three test conditions is shown in Table 1. The performance graphs for these are shown in FIGS. 8 and 9.

Test C

Humidity—Non-operating

In this test, all lamps performed equally well, and did not experience a color change, edge darkening or brightness loss.

Test A (FIG. 8)

Humidity—Operating

The "Aclar" lamp was about equal to the lamp with processed phosphor and superior to the lamp with unprocessed phosphor.

The processed phosphor lamp and the "Aclar" lamp remained white in color, while the unprocessed phosphor lamp turned pink.

Edge and panel darkening was very pronounced with the unprocessed phosphor panel. The "Aclar" lamp did not show this phenomenon and the processed phosphor lamp exhibited only slight darkening.

All lamps lost brightness during the humidity test cycle. After 480 hours, the unprocessed phosphor, processed phosphor and "Aclar" lamps had retained 20, 30 and 35%, respectively, of their initial brightness.

Test B (FIG. 9)

SLC—Operating

All lamps retained their white operating color. Only the unprocessed phosphor lamp showed the edge and panel darkening phenomenon. The brightness retention of the processed phosphor lamp and the "Aclar" lamp were essentially equivalent at 51% and 54%, respectively. The unprocessed phosphor lamp retained 43% of its original brightness value.

TABLE 1

| | Humidity Non-Operating | | | Humidity Operating | | | SLC Operating | | |
|---|---|---|---|---|---|---|---|---|---|
| LAMP | A | B | C | A | B | C | A | B | C |
| Unprocessed Phosphor | White | No | 100 | Pink | Yes | 20 | White | Yes | 4 |
| Processed | Blue | | | v. | | | | | |

TABLE 1-continued

| LAMP | Humidity Non-Operating | | | Humidity Operating | | | SLC Operating | | |
|---|---|---|---|---|---|---|---|---|---|
| | A | B | C | A | B | C | A | B | C |
| Phosphor | White | No | 100 | White | slight | 30 | White | No | 5 |
| "Aclar" | White | No | 100 | White | No | 35 | White | No | 5 |

A = panel color after 480 hours
B = edge darkening
C = percentage brightness retained after 480 hours Significantly, the lamps which contained phosphor coated in accordance with this invention performed approximately equal to the "Aclar" encased lamp. The lamps retained their original desirable white color, edge darkening was negligible, and the lamps further retained their original overall light tan color in the unlighted condition, while lamps using the unprocessed or uncoated phosphor showed a shift to gray color in the unlighted condition. Table No. 2, below, shows the results of color change in the X and Y coordinates based on the standard CIE chromoticity chart and system of coordinates when lamps incorporating coated or processed phosphor were operated under standard laboratory conditions and under conditions of high humidity, as previously defined in FIGS. 9 and 8, respectively, and as compared with test lamps made with untreated phosphor under the same conditions. It will be seen by reference to Table 2 that the lamps which contained phosphor coated in accordance with this invention exhibited less color shift than did lamps employing untreated phosphor.

TABLE 2

| | SCL | | Humidity | |
|---|---|---|---|---|
| | 0hrs | 336 hrs | 0hrs | 1000 hrs |
| Processed Phosphor | | | | |
| X | 0.313 | 0.333 | 0.376 | 0.459 |
| Y | 0.361 | 0.375 | 0.346 | 0.426 |
| Unprocessed Phosphor | | | | |
| X | 0.345 | 0.379 | 0.345 | 0.471 |
| Y | 0.352 | 0.368 | 0.359 | 0.527 |

An important advantage of lamps made employing the phosphor processed according to this invention resides in the fact that the lamps may be trimmed, die-cut or punched, after manufacture, through the operative layers, with only minimal edge darkening, even under the severe humidity and temperature conditions of test A, FIG. 8.

While the method herein described, and the form of apparatus for carrying this method into effect, constitute preferred embodiments of this invention, it is to be understood that the invention is not limited to this precise method, and form of apparatus, and that changes may be made therein without departing from the scope of the invention, which is defined in the appended claims.

What is claimed is:

1. The method of coating electroluminescent phosphor particles with glass, comprising the steps of:
   placing a quantity of phosphor particles on the floor of a heating vessel,
   heating the phosphor particles to be coated to a temperature of about 490° C., and while so heated subjecting the particles to an atmosphere of $SiH_4$ and oxygen in a ratio which provides excess oxygen to the reaction causing $SiO_2$ to form on the surface of the heated phosphor particles, and continuously stirring the particles in said vessel to expose all surfaces of said particles to said atmosphere to form an $SiO_2$ barrier of uniform thickness in the order of approximately 0.1 to 3.0 microns which fully encapsulates the particles.

2. The method of claim 1 in which said stirring step includes the lifting of a portion of said quantity of said particles off of the floor of said vessel and allowing said portion to free-fall back onto the floor.

3. The method of claim 1 further including the step of leveling said quantity of particles following said stirring step.

4. The method of claim 1 in which said particles are subjected to said atmosphere at said temperature for approximately 1.5 to 2.5 hours.

5. The method of claim 1 in which said $SiH_4$ is diluted by nitrogen at a ratio of approximately 1-2% $SiH_4$ to 99-98% $N_2$.

6. The method of coating particles of electroluminescent phosphors, comprising the steps of:
   heating the phosphor particles to be coated to a temperature of about 490° C.,
   subjecting said heated particles to an atmosphere, the principal active ingredient comprising $SiH_4$ and oxygen in a ratio which provides excess oxygen to the reaction, and
   continuously agitating the particles to expose all surfaces thereof to said atmosphere while so heated to form an $SiO_2$ barrier of uniform thickness on the surface of said heated particles which fully encapsulates the particles.

7. The method of claim 6 in which said particles are subjected to said atmosphere for a time sufficient to form an $SiO_2$ layer thereon of between 0.1 and 3.0 microns in thickness.

* * * * *